UNITED STATES PATENT OFFICE.

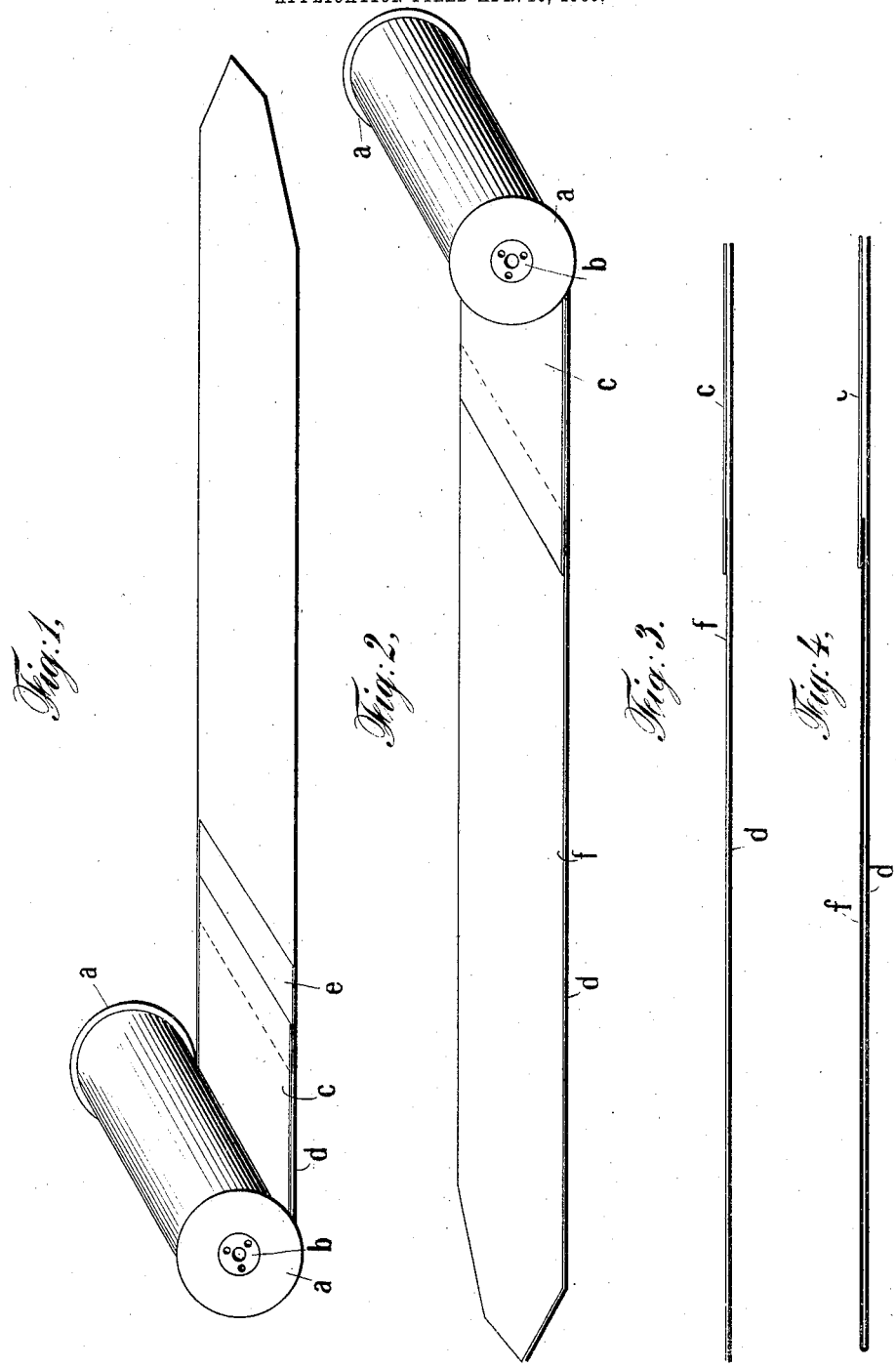

EDWARD C. DAVIDSON, OF ELIZABETH, NEW JERSEY.

PHOTOGRAPHIC-FILM ROLL.

No. 832,460.

Specification of Letters Patent.

Patented Oct. 2, 1906.

Application filed April 16, 1906. Serial No. 311,838.

*To all whom it may concern:*

Be it known that I, EDWARD C. DAVIDSON, a citizen of the United States of America, residing in Elizabeth, county of Union, State of New Jersey, have invented certain new and useful Improvements in Photographic-Film Rolls, of which the following is a specification.

This invention relates to daylight-loading photographic-film rolls, and is shown applied to a form of roll or cartridge now extensively used.

It comprises a novel means whereby the end of the film last wound upon the receiving or winding reel in the camera may be conveniently and accurately led or drawn with the paper backing when attached to the winding device in a daylight-developing apparatus—such, for instance, as that known as the "McCurdy."

In the accompanying drawings, Figure 1 is a perspective view showing a cartridge as supplied for insertion into the camera, but partially unwound to show the terminal of the continuous backing and the end of the sensitized film attached to it; Fig. 2, a similar view showing the paper backing and film when wound upon the winding or receiving reel of the camera and therefore in the condition in which it is to be placed in a daylight-developing box, except that the paper and film are partially unwound to show the device by means of which the film may be wound with its continuous backing in the developing-box; Fig. 3, an edge view of the unwound part of the backing and film appearing in Fig. 2, and Fig. 4 a view similar to Fig. 3, but showing a modification.

In Fig. 1 *a* represents the flanges of the reel, and *b* its core. *c* indicates the sensitized photographic film, which is wound upon the reel with a continuous strip *d*, of appropriate material and to which the leading end of the film is secured by a pasted strip *e* or otherwise, as may be desired. The continuous strip *d* extends a substantial distance beyond the end of the film, and when completely wound upon the flanged reel the film is protected from light. In devices of this character in most general use the strip *d* is of opaque material, such as black paper, and is provided upon its outer face with exposure marks or numbers to be viewed through the peephole of the camera and also with marks indicating where the film is to be cross-cut after exposure. The device is illustrated in Fig. 1 and, as thus far described, may be in all respects the same as the daylight-loading cartridges now largely sold and known as "Kodak" or "Ansco" daylight-loading rolls or film cartridges.

Fig. 2 shows the end of the film *c* and continuous backing strip *d*, which last leave the supply-roll in the camera and are therefore last wound upon the receiving-reel. They are therefore the ends which first pass from the receiving-reel when a daylight-loading developer is employed. At this end the strip *d* is also extended beyond the film, so that when wound upon the receiving-reel, as in Fig. 2, the final convolutions of the strip *d* serve to exclude light. In order that the end of the film *c* may be led or wound with the continuous strip *d* in a daylight-developing box, there is pasted or otherwise secured to the end of the film a flexible strip *f*, of any suitable material—such, for instance, as paper of any appropriate color or character—which extends from the film to or substantially to the end of the strip *d*. The drawings show the strips *f* and *d* as terminating at the same point and as of substantially equal width so that the two ends may be inserted in a slot in the core of a winding-reel or otherwise attached thereto.

In Fig. 4 the extended end of strip *d* and the strip *f* are indicated as one—that is to say, the strip *d* extends from the point at which it ordinarily terminates back to the film *c*, to which it is secured.

I claim as my invention—

1. A photographic-film roll comprising sensitized film superimposed upon a continuous backing which extends beyond the ends of the film and a leading-strip attached to that end of the film which is last wound upon the receiving-reel in the camera and extends to the corresponding end of the continuous backing.

2. A daylight-loading film-roll comprising a flanged reel, a continuous strip of sensitized film, a continuous backing of opaque material upon which the sensitized strip is superimposed and which extends beyond the ends of the sensitized strip, the sensitized strip being secured to the opaque backing at one end and a strip of flexible material attached to the other end of the sensitized film and extending substantially to the corresponding end of the opaque backing.

In testimony whereof I have hereunto subscribed my name.

EDWARD C. DAVIDSON.

Witnesses:
 L. F. BROWNING,
 E. L. HUTCHINGS.